United States Patent [19]

Stemme et al.

[11] 4,358,805
[45] Nov. 9, 1982

[54] PLAYBACK AND/OR RECORDING DEVICE FOR MAGNETIC RECORDING MEDIA, ESPECIALLY STILL PHOTOGRAPHS PROVIDED WITH A MAGNETIZABLE COATING

[75] Inventors: Otto Stemme, Munich; Frank Staudacher, Haan; Peter Lermann, Westerham; Eduard Wagensonner, Aschheim; Karl-Heinz Schultheiss, Taufkirchen, all of Fed. Rep. of Germany

[73] Assignee: AGFA-Gevaert AG, Leverkusen, Fed. Rep. of Germany

[21] Appl. No.: 74,115

[22] Filed: Sep. 10, 1979

[30] Foreign Application Priority Data

Sep. 14, 1978 [DE] Fed. Rep. of Germany ....... 2840052

[51] Int. Cl.³ .......................... G11B 5/55; G11B 15/12
[52] U.S. Cl. ..................................... 360/106; 360/61; 360/78
[58] Field of Search ................... 360/101, 106, 81, 82, 360/61, 63, 78

[56]  References Cited

U.S. PATENT DOCUMENTS 3,185,776  5/1965  Bender ................................. 360/101
3,495,047  2/1970  Atsumi et al. ........................ 360/63
3,583,709  2/1971  Dollenmayer ...................... 360/101

Primary Examiner—Vincent P. Canney
Attorney, Agent, or Firm—Michael J. Striker

[57]  ABSTRACT

A photographic still provided with a magnetizable coating is inserted into a recording/playback device provided with a movably mounted head unit having a set of heads. A rotary motor drives an endless belt in a single direction, the upper and lower runs of the belt always travelling in opposite directions. The head unit is alternately coupled to the upper and to the lower run of the belt, for travel in one and then the opposite direction. Upon each reversal of the travel direction of the head unit, a successive one of the magnetic heads is activated, so as to track a meandering track on the magnetic coating.

6 Claims, 5 Drawing Figures

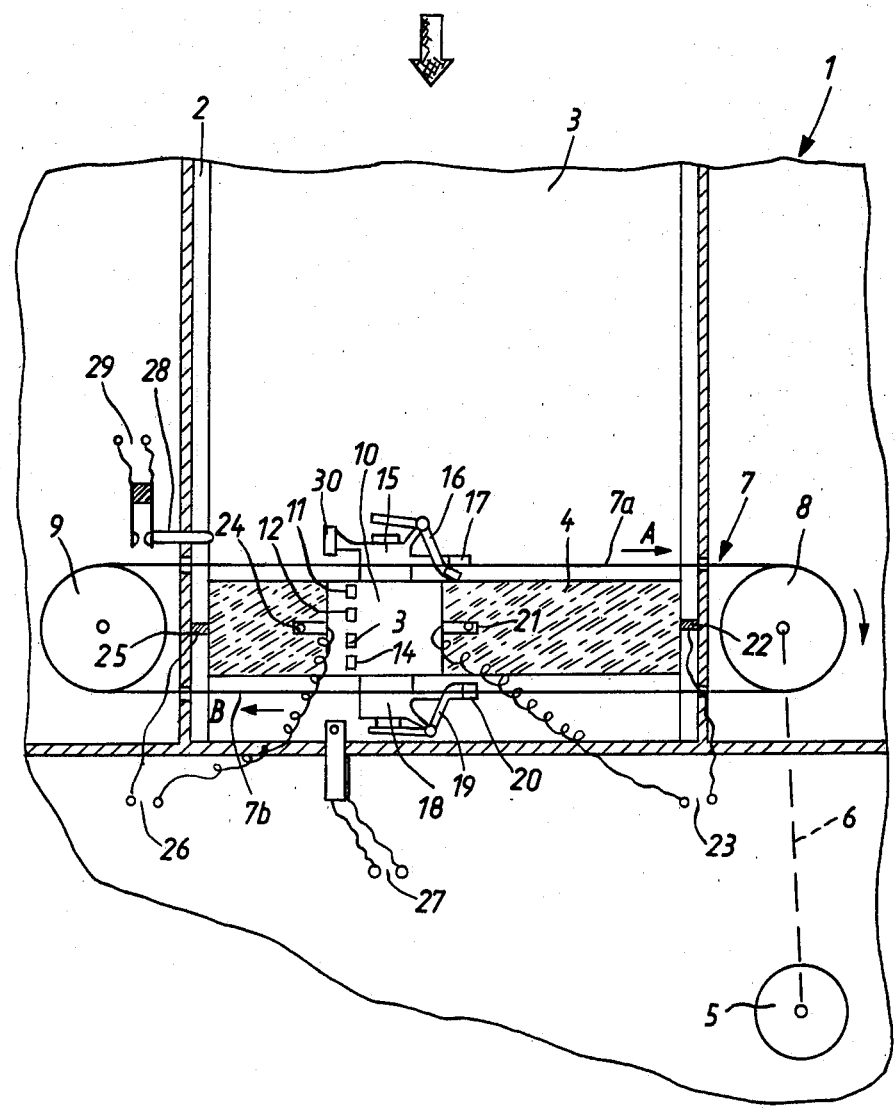
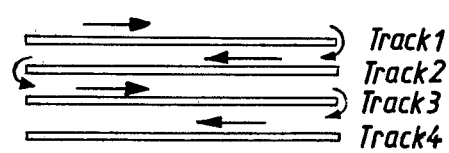
Fig. 1
Fig. 2

PLAYBACK AND/OR RECORDING DEVICE FOR MAGNETIC RECORDING MEDIA, ESPECIALLY STILL PHOTOGRAPHS PROVIDED WITH A MAGNETIZABLE COATING

BACKGROUND OF THE INVENTION

The present invention concerns playback and/or recording devices for magnetic recording media, and is especially but not exclusively concerned with still photographs having a magnetizable coating on which spoken words can be magnetically recorded for later reproduction, e.g., so that loose photographs can be provided with a recorded spoken identification of their subject matter.

SUMMARY OF THE INVENTION

It is a general object of the invention to provide a very simple recording and/or playback device whose basic operating principle is well suited to the application stated above, although also of more widespread applicability.

It is a further object of the invention to provide a recording and/or playback device whose mode of operation optimally utilizes the limited space available on a still photograph, or other recording medium, for the recording of spoken words or other data.

In the presently preferred embodiments of the invention, the inventive recording and/or playback device includes holding means for holding a magnetic recording medium, such as a still photograph provided with a magnetizable coating, a movably mounted head unit for tracking tracks on the recording medium and comprised of a plurality of magnetic heads located to track respective ones of such tracks. A rotary prime mover rotates in a single direction during recording or playback operation but drives first and second drive means which move in directions opposite to each other. The multi-head unit is alternately coupled to the first and to the second drive means, and successive heads of the head unit are activated in a predetermined sequence during successive, alternate-direction movements of the head unit.

An advantage of this mode of operation is that both the rotary prime mover and also the first and second drive means need only move in a single direction and need not be reversible. As a result, the work of accelerating the not entirely negligible mass of the head unit need only be performed at the start and end of the operating cycle. Preferably, when the head unit reverses direction to commence the tracking of the next track the head unit does not shift relative to the recording medium in the direction transverse to the direction in which the tracks are spaced from each other, so that all motions performed by the head unit can be achieved by coupling it to either the first or the second drive means, with the shift from one track to the next being effected by activating successive ones of the plural heads of the head unit. It becomes possible, if the mass of the head unit is sufficiently low, to perform the direction reversal at the end of each track or track segment very quickly so that the transitional time interval from rated-speed travel of the head unit in one direction to the establishment of rated-speed travel of the head unit in the opposite direction be very small and not have any marked effect upon the recording or playback action.

The first and second drive means may be constituted by first and second runs of an endless belt, cord or chain, the endless loop being driven by the rotary prime mover in a single direction, but the two runs thereof always travelling in opposite directions, with the head unit of the device alternately coupled to the first and to the second run of the endless loop. Use may be made of two electromagnetic couplings, one operative when activated for coupling the head to the first run and the other to the second run.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 schematically depicts the mechanical components of an exemplary recording/playback machine embodying the present invention;

FIG. 2 depicts the manner in which successive tracks or track segments succeed one another, in the exemplary embodiment;

DESCRIPTION OF THE PREFERRED EMBODIMENTS

Figure 3:
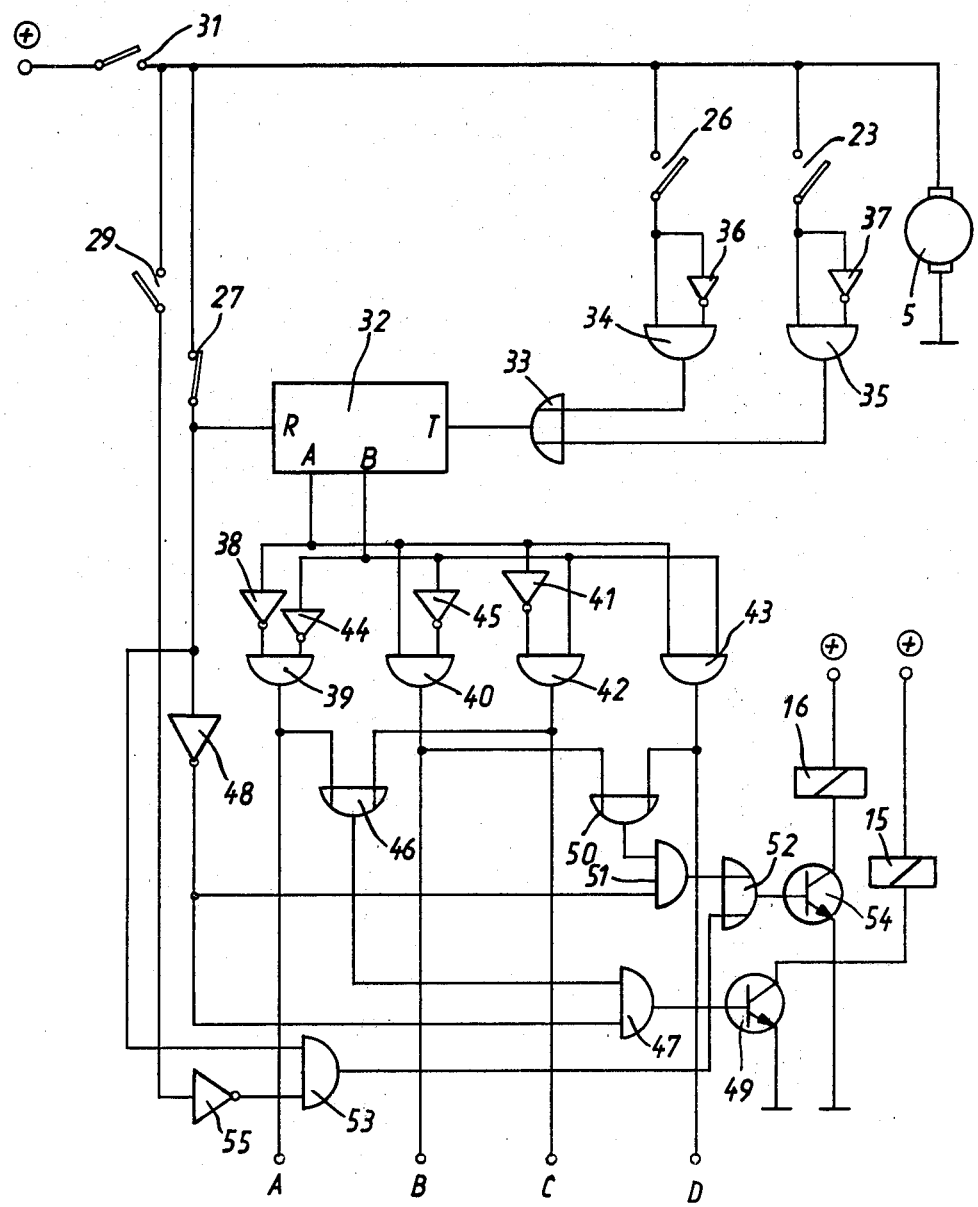
FIGS. 3 and 4 together depict the control circuitry of the exemplary embodiment.

FIG. 1 depicts a playback/record device 1 embodying the present invention. Device 1 includes a compartment 2 into which can be inserted a photographic still picture 3 which has been provided with a magnetizable coating 4 which is to act as a sound track for the recording and/or playback of, for example, an interval of recorded speech descriptive of the subject photographed. The playback/record device 1 includes an electric motor 5 which via a transmission 6 drives a driver roller 8. Trained around drive roller 8 and a cooperating guide roller 9 is an endless belt 7, in this embodiment preferably provided with a coating of flexible magnetically conductive material. At least during normal operation, motor 5 always operates in a single direction only, and endless belt 7 is transported in a single direction only, the upper run 7a always travelling in the direction of arrow A and the lower run 7b always in the direction of arrow B.

Numeral 10 denotes a magnetic-head unit mounted (by non-illustrated means, such as a guide bar) for leftward and rightward travel in the direction of arrows A and B. Head unit 10 is provided with four playback/record heads 11, 12, 13, 14, spaced one from the next in the direction perpendicular to the travel direction of head unit 10. In FIG. 1, all four heads 11-14 are shown located towards the left end of head unit 10; alternatively, and for reasons which will become apparent below, to achieve a better utilization of available space the odd-numbered heads 11 and 13 could be located at the left end of head unit 10 and the even-numbered heads 12 and 14 at the right end, for example. The starts of the magnetic tracks tracked by odd-numbered heads 11 and 13 are located at the left in FIG. 1, and the starts of the magnetic tracks tracked by the even-numbered heads 12 and 14 are located at the right end of the magnetizable coating 4 of the photographic still picture 3.

The upper side of head unit 10 is provided with a first electromagnet 15 having a pivotable armature 16. The left end of armature lever 16 is pulled down when electromagnet 15 is energized, whereas the right end of armature lever 16 is urged upwards. The end portion of the right end of armature lever 16 includes a finger which extends beneath the underface of the upper run 7a of endless belt 7. The stator of the electromagnet 15 furthermore includes a portion 17 which is located above the upper face of the upper run 7a of belt 7. When electromagnet 15 is energized, the right end of armature lever 16 is pressed upwards, clamping between itself and stator portion 17 the upper run 7a of belt 7b, and thereby causing the head unit 10 to be pulled by belt 7 in the direction of arrow A. The magnetic conductivity of the belt 7 can assist this coupling action if the flux path of the armature extends through the portions 16 and 17 of the electromagnet and through the belt 7 itself.

Alternatively, the core of electromagnet 15 could be located directly beneath (or above) the upper run 7a of magnetically conductive belt 7 and be provided with a guide channel through which upper run 7a can travel when electromagnet 15 is not coupled to the belt; in that event the belt run 7a, when electromagnet 15 is energized, could be clamped directly between the core and armature of such electromagnet. Other such modifications are possible.

If the belt 7 is not made of magnetically conductive material and does not carry the working flux of the electromagnet 15, then the clamping portions 17 and 18 can nevertheless be designed to achieve a positive grip on upper belt run 7a and very positively couple the head unit 10 to belt run 7a.

At its lower end, head unit 10 is provided with a second such electromagnet 18 provided with an armature lever 19 and a stator portion 20 between which two the lower run 7b of belt 7 can be clamped, for coupling head unit 10 to lower run 7b and effecting leftwards travel of the head unit.

The head unit 10 is provided with a right sensing contact 21 which engages a stationary contact 22 provided on the housing of playback/record device 1 when head unit 10 has been brought to its rightmost position. The head-unit-mounted travelling contact 21 and stationary contact 22 together form a right limit switch 23. Head unit 10 is further provided with a left sensing contact 24 which engages a stationary contact 25 mounted on the housing of playback/record device 1 when head unit 11 has reached its leftmost position. The moving and stationary contacts 24, 25 together form a left limit switch 26.

Photograph-accommodating compartment 2 is provided, at its bottom, with a photograph-sensing switch 27 which is normally closed but opens when a photograph 3 is inserted into compartment 2.

In the illustrated embodiment, there is furthermore provided, near the left edge of an inserted still photograph 3, and end switch 29 which is normally open but closes when head unit 10 has reached its leftmost position. The illustrated contacts of end switch 29 are pressed together by means of a switch-actuating pin 28 which is pressed leftwards by a projection 30 on head unit 10.

FIG. 2 schematically depicts the relative locations and orientations of the four sound tracks, or sound-track portions, provided on magnetic coating 4, as tracked by the magnetic heads on head unit 10. The start of the first track is at the left and its end at the right, the start of the second track at the right and its end at the left, the start of the third track at the left and its end at the right, and the start of the fourth track at the right and its end at the left.

FIG. 3 depicts the circuitry used to control the travel of head unit 10 and used to select one of magnetic heads 11-14 at a time for operation.

In FIG. 3, numeral 31 denotes a manually operated power-connect switch. Numeral 32 denotes a two-bit binary counter having outputs A and B. The logic signals on outputs A and B are respectively a "0" and a "0" when head 11 is to be selected, are respectively a "1" and a "0" for head 12, are respectively a "0" and a "1" for head 13, and are respectively a "1" and a "1" for head 14. The reset input R of digital counter 32 is connected to positive potential via the aforementioned normally closed photograph-sensing switch 27, which operates as a start switch. The counting input T of counter 32 is connected to the output of an OR-gate 33. The upper input of OR-gate 33 is connected to the output of a pulse generator stage 34, 36 whose input is connectable to positive potential via left limit switch 26. The lower input of OR-gate 33 is connected to the output of a pulse generator stage 35, 37 whose input is connectable to positive potential via right limit switch 23. Pulse generator stage 34, 36 comprises an AND-gate 34 whose left input is connected to the lower contact of left limit switch 26 directly, and whose right input is connected thereto via an inverter 36; when left limit switch 26 is closed, pulse generator stage 34, 36 produces at its output a brief pulse whose duration is equal to the brief time delay inherent in inverter 36. The other pulse generator stage 35, 37, associated with right limit switch 23, operates in the same way.

Output A of counter 32 is connected via an inverter 38 to the left input of a first AND-gate 39, is connected directly to the left input of a second AND-gate 40, is connected via an inverter 41 to the left input of a third AND-gate 42, and is directly connected to the left input of a fourth AND-gate 43.

Output B of counter 32 is connected via an inverter 44 to the right input of AND-gate 39, via an inverter 45 to the right input of AND-gate 40, directly to the right input of AND-gate 42 and directly to the right input of AND-gate 43.

The outputs of AND-gates 39, 40, 42, 43 are connected to respective output terminals A, B, C, D, also shown in FIG. 4 described below.

The outputs of the first and third AND-gates 39, 42 are connected to the inputs of an OR-gate 46 whose output is connected to the upper input of an AND-gate 47. The lower input of AND-gate 47 is connected via an inverter 48 to the photograph-responsive start switch 27. The output of AND-gate 47 is connected to the base of a switching transistor 49 in whose collector circuit the winding of electromagnet 15 is connected.

The outputs of the second and fourth AND-gates 40, 43 are connected to the inputs of an OR-gate 50 whose output is connected to the upper input of an AND-gate 51. The lower input of AND-gate 51 is connected, via inverter 48, to photograph-responsive start switch 27. The output of AND-gate 51 is connected to the upper input of an OR-gate 52 whose lower input is connected to the output of an AND-gate 53. The output of OR-gate 52 is connected to the base of a switching transistor 54 in whose collector circuit is connected the winding of electromagnet 16. The upper input of AND-gate 53 is connected directly to photograph-responsive start switch 27, and its lower input is connected via an inverter 55 to the aforementioned end switch 29.

Figure 4:
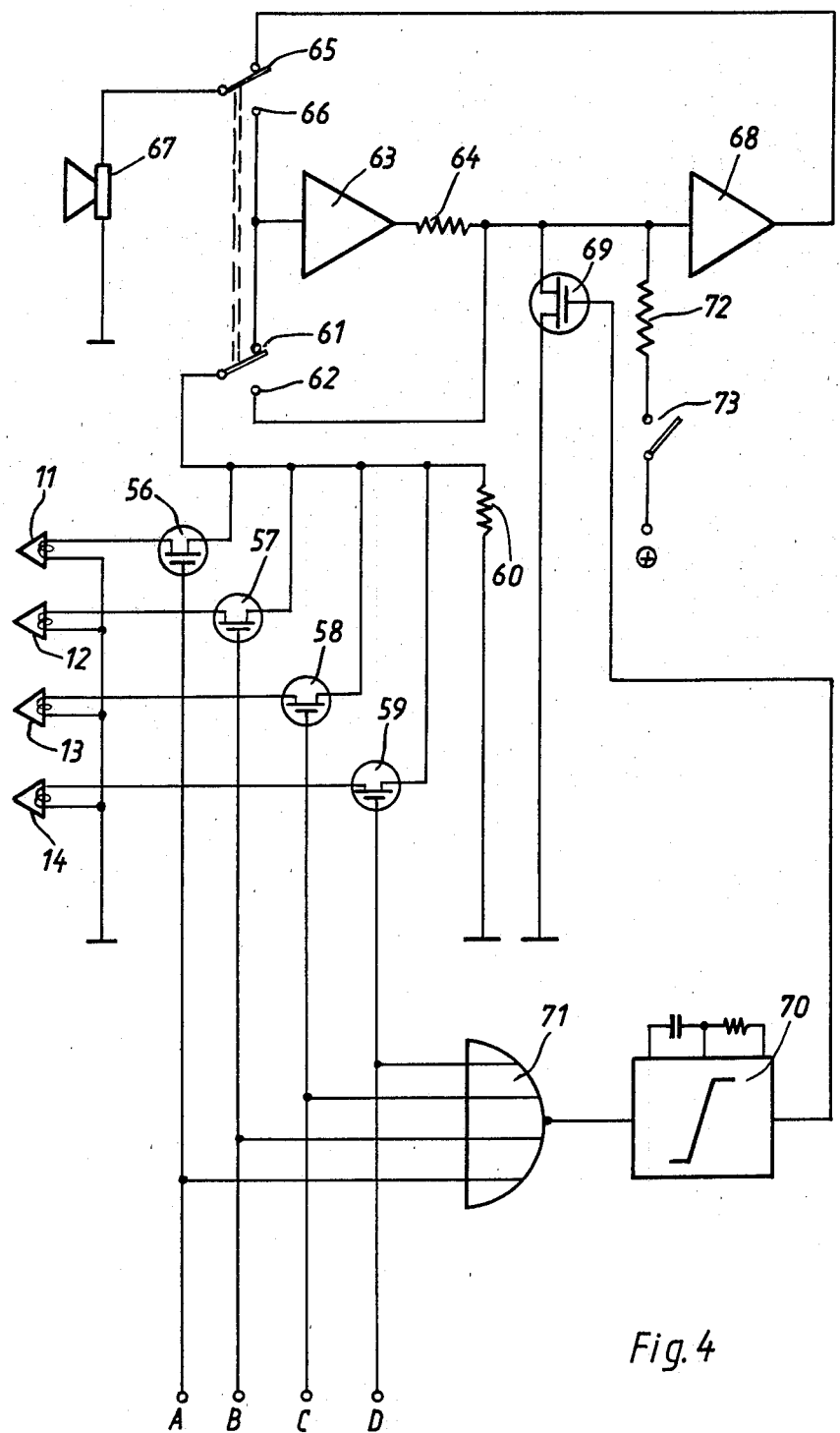

FIG. 4 depicts the record/playback control circuitry of the device, the output terminals A, B, C, D of the circuitry of FIG. 3 being reproduced in FIG. 4. Output terminals A, B, C, D are connected to the control electrodes of respective field-effect transistors 56, 57, 58, 59. The FET's 56–59 are each connected in the current path of a respective one of the four magnetic playback/record heads 11, 12, 13, 14. Numeral 60 denotes a shunt resistor. The right electrodes of FET's 56–59 are connected in common to the moving contact of a changeover switch 61, 62, via whose contact 61 they are connectable in common to the input of a preamplifier 63 in whose output circuit is connected a working resistor 64. Ganged to changeover switch 61, 62 is a further changeover switch 65, 66, to whose moving contact is connected an electroacoustical transducer 67 alternatively operated as a microphone or as a speaker. In the illustrated setting of changeover switch 65, 66, transducer 67 operates as a speaker and is connected to the output of an end amplifier 68, whose input is connected via resistor 64 to the output of preamplifier 63. The FET's 56–59 in the current paths of the heads 11–14 are, for the illustrated settings of the changeover switches, connected in common to the input of preamplifier 63.

In the non-illustrated settings of the ganged-together changeover switches 61, 62 and 65, 66, electro-accoustical transducer 67 operates as a microphone and is connected via contact 66 to the input of preamplifier 63. The output of preamplifier 63 is then connected to the common electrodes of the FET's 56–59 in the current paths of the four head 11–14.

The changeover switches 61, 62 and 65, 66 are manually operated, as is also a switch 73 operative for connecting an input resistor 72 for end amplifier 68 to positive potential, these manually operated switches being operated by the user to select between record and playback modes of operation.

Numeral 69 denotes a field-effect transistor whose main-electrode path is connected between ground, on the one hand, and the junction between the output of preamplifier 63 and the input of end amplifier 68. FET 69 is rendered conductive during direction reversals of the travelling head unit 10, both during the record and the playback modes of operation. In the playback mode (changeover switches 61, 62 and 65, 66 in their illustrated settings), conduction by FET 69 prevents the transmission of direction-reversal noise to the input of end amplifier 68 and thereby prevents reproduction of such noise by transducer 67. In the record mode of operation (the changeover switches in their non-illustrated settings), conduction by FET 69 shunts current away from FET's 56–59 thereby preventing recording of direction-reversal noise. The control electrode of FET 69 is connected to the output of a monostable multivibrator 70, whose input is connected to the output of an OR-gate 71. OR-gate 71 has four inputs connected to respective ones of the four output terminals A, B, C, D of the circuitry of FIG. 3.

The device described above operates as follows:

If no photograph 3 having a magnetic coating 4 is inserted into the playback/record device 1, switch 27 is closed and accordingly (see FIG. 3) counter 32 maintained in reset state. Consequently, AND-gate 47 is blocked and coupling electromagnet 15 unenergized. Power-connect switch 31 was previously closed manually, so that motor 5 is in operation and endless belt 7 is in motion. End switch 29 is closed, because the leftmost position of travelling head unit 10 is its starting position. Accordingly, AND-gate 53 is blocked, as is AND-gate 51, and OR-gate 52 produces no output "1" signal such as would energize coupling electromagnet 16.

If a photograph or slide 3 is inserted, start switch 27 opens and AND-gate 47 produces an output "1" signal. As a result, transistor 49 becomes conductive and coupling magnet 15 becomes energized. Sound head unit 10 becomes coupled to the upper run 7a of endless belt 7 and begins to travel in the direction of arrow A (FIG. 1). At the end of the rightwards-going first track, right limit switch 23 closes and pulse generator stage 35, 37 (FIG. 3) applies a pulse to OR-gate 33, as a result of which the digital counter 32 advances by one count, i.e., so that its outputs A and B now carry a "0" signal and a "1" signal, respectively. Consequently, coupling magnet 15 becomes deenergized whereas coupling magnet 16 becomes energized; head unit 10 is now coupled to the lower run 7b of endless belt 7 and is pulled in the direction of arrow B. At the end of the leftwards-going second track, left limit switch 26 closes and digital counter 32 advances to its next count, counter output A now carrying a "1" signal and counter output B a "0" signal.

At the end of the rightwards-going fourth track, right limit switch 23 is closed again, and digital counter 32 returns to its original state, i.e., both outputs thereof carrying "0" signals. With end switch 29 now closed, sound head unit 29 stays in its leftmost, starting position. Neither of the two coupling electromagnets 15, 16 can become energized.

As the digital counter 32 advances through successive ones of its four states, a "1" signal is produced in succession on output terminal A, then B, then C, then D of the circuitry of FIG. 3. In the circuitry of FIG. 4, this serves to forwards bias successive ones of the FET's 56, 57, 58, 59, only one of these four FET's being conductive at any given time. As the "1" signal jumps from one to the next of the terminals A, B, C, D, each such transition, which occurs at the end of a track, triggers monostable multivibrator 70 via OR-gate 71, and multivibrator 70 applies a limited duration pulse to the control electrode of FET 69, rendering the latter conductive, thereby preventing the reproduction of direction-reversal noise in the playback mode or the recording of direction-reversal noise in the record mode.

Figure 5:
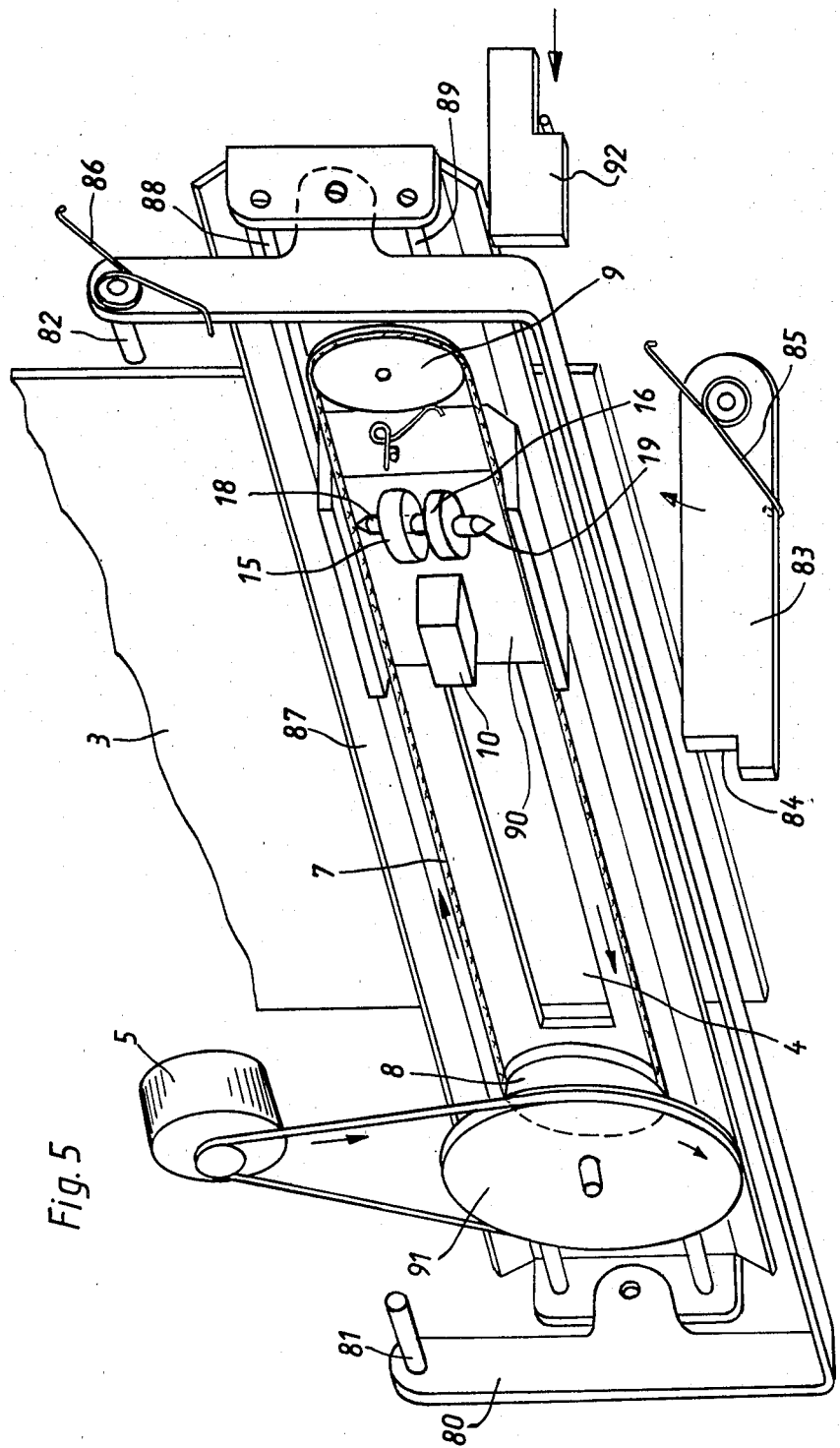
FIG. 5 depicts a further construction for the mechanical components of the recording/playback machine.

FIG. 5 depicts a further construction of the playback/record device, components the same as those in FIG. 1 being denoted by the same reference numerals as there. Numeral 80 denotes a swingable bracket mounted for swinging movement on two horizontal pivot pins 81, 82. Bracket 80 is biased by a spring 86 rearwards, i.e., towards an inserted still photograph or slide 3. However, absent an inserted photograph 3, bracket 80 is latched in a position somewhat forwards of that into which it snaps upon photograph insertion, the bracket 80 being in particular latched at its lower edge in the recess 84 of a photograph ejector 83. A biasing spring 85 biases ejector 83 upwards, for photograph ejection. Swingable bracket 80 mounts a pressure plate 87 having an elongated cut-out through which the magnetic coating 4 of the inserted photograph 3 is exposed to the heads of the sound head unit 10. Pressure plate 87 is provided with two guide rails 88, 89 on which the carriage 90 for the sound head unit 10 rides. Numeral 91 denotes a flywheel, and numeral 92 denotes a manually operated ejector button.

When no photograph 3 has been inserted into the device, the lower edge of swing bracket 80 is latched in recess 84 of photograph ejector 83. As a photograph 3 is inserted, it is not pressed by the pressure plate 87 on swing bracket 80, because bracket 80 is still in latched position. When the lower edge of the inserted photograph 3 depresses ejector 83, swing bracket 80 becomes unlatched, and its biasing spring 86 swings bracket 80 and in particular its pressure plate 87 into pressing engagement against the magnetic coating 4 of the photograph, pressing this portion of the photograph against a (non-illustrated) counterpressure plate located behind photograph 3, as viewed in FIG. 5. When the desired recording or playback operation has been finished, the user depresses ejector button 92, the latter pressing swing bracket 80 away from photograph 3 and thereby permitting photograph ejector 83 to swing upwards under the action of its associated biasing spring 85, as a result of which the photograph 3 pops up. As ejector 83 ejects the photograph, its recess 84 once more latches the swing bracket 80 into the starting position thereof, and the user can let go of ejector button 92.

It will be understood that each of the elements described above, or two or more together, may also find a useful application in other types of constructions and control circuitry, differing from the types described above.

While the invention has been illustrated and described as embodied in a device for recording or reproducing sound onto or from a magnetic coating on a still photograph, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for recording information onto a magnetic recording medium and/or reproducing recorded information therefrom, the device comprising holding means for holding the magnetic recording medium; a movably mounted head unit for tracking tracks on the magnetic recording medium, including a plurality of magnetic heads located to track respective ones of such tracks; a rotary prime mover rotating in a single direction; drive means constituted by runs of an endless drive loop driven by the rotary prime mover in a single direction and travelling in opposite respective directions; coupling means activatable for coupling the head unit alternatively to one or another of said runs of said endless drive loop so that the head unit be moved in one or the opposite direction; control circuit means electrically connected to the coupling means and to the plurality of magnetic heads, operative for causing the coupling means to alternately couple the head unit to the one and to the other of said runs to effect movement of the head unit in one and then the opposite direction and operative for activating successive ones of the plural magnetic heads in a predetermined sequence during respective movements of the head unit in one and then the opposite direction; the control circuit means including digital counting means operative for counting the number of times the head unit has been coupled to and driven by the one and the other runs, and a plurality of semiconductor switches each connected in circuit with a respective one of the plurality of magnetic heads and a plurality of gates each having an output connected to a respective one of the semiconductor switches for controlling the conduction state thereof, the digital counting means having plural outputs, the gates having inputs connected to differing ones of the outputs of the counting means.

2. A device for recording information onto a magnetic recording medium and/or reproducing recorded information therefrom, the device comprising holding means for holding the magnetic recording medium; a movably mounted head unit for tracking tracks on the magnetic recording medium, including a plurality of magnetic heads located to track respective ones of such tracks; a rotary prime mover rotating in a single direction; drive means constituted by runs of an endless drive loop driven by the rotary prime mover in a single direction and travelling in opposite respective directions; coupling means activatable for coupling the head unit alternatively to one or another of said runs of said endless drive loop so that the head unit be moved in one or the opposite direction; and control circuit means electrically connected to the coupling means and to the pluralityof magnetic heads, operative for causing the coupling means to alternately couple the head unit to the one and to the other of said runs to effect movement of the head unit in one and then the opposite direction and operative for activating successive ones of the plural magnetic heads in a predetermined sequence during respective movements of the head unit in one and then the opposite direction; and the control circuit means including means responding to premature withdrawal of the recording medium from the holding means by automatically returning the head unit to a predetermined starting position.

3. The device defined in claim 2, the means returning the head unit to starting position including end switch means generating an end signal when the head unit is in starting position, furthermore including switch means responsive to the presence of recording medium in the holding means and generating a recording-medium signal, the control circuit means furthermore including means preventing the head unit from being coupled to the drive means upon the concurrent presence of the end signal and absence of the recording-medium signal.

4. A device for recording information onto a magnetic recording medium and/or reproducing recorded information therefrom, the device comprising holding means for holding the magnetic recording medium; a movably mounted head unit for tracking tracks on the magnetic recording medium, including a plurality of magnetic heads located to track respective ones of such tracks; a rotary prime mover rotating in a single direction; drive means constituted by runs of an endless drive loop driven by the rotary prime mover in a single direction and travelling in opposite respective directions; coupling means activatable for coupling the head unit alternatively to one or another of said runs of said endless drive loop so that the head unit be moved in one or the opposite direction; control circuit means electrically connected to the coupling means and to the plurality of magnetic heads, operative for causing the coupling means to alternately couple the head unit to the one and to the other of said runs to effect movement of the head unit in one and then the opposite direction and operative for activating successive ones of the plural magnetic heads in a predetermined sequence during respective movements of the head unit in one and then the opposite direction; the control circuit means including digital counting means operative for counting the number of times the head unit has been coupled toand driven by the one and the other runs, and further including sensing switch means generating a first signal when the head unit is decoupled from the one run and coupled to the other run and a second signal when the head unit is decoupled from the other run and coupled to the one run, an OR-gate receiving the first and second signals and transmitting them to the counting means to be counted by the latter.

5. The device defined in claim 4, the plurality of magnetic heads comprising at least first, second, third and fourth magnetic heads for tracking respective tracks of the recording medium, furthermore including logic gate means having inputs connected to the outputs of the gates associated with the odd-numbered heads and having an output at which is produced a signal commanding that the coupling means couple the head unit to the one run, and another logic gate means having inputs connected to the outputs of the gates associated with the even-numbered heads and having an output at which is produced a signal commanding that the coupling means couple the head unit to the other run.

6. The device defined in claim 4, each of said logic gate means additionally having an enablement input, the control circuit means furthermore including start switch means operative for applying an enablement signal to the enablement input of each of said logic gate means in response to insertion of recording medium into the holding means.

* * * * *